（12) United States Patent
Lewis

(10) Patent No.: US 9,131,214 B2
(45) Date of Patent: Sep. 8, 2015

(54) DIAGNOSTICS SYSTEM FOR REMOTELY LOCATED TELEVISIONS

(71) Applicant: Richard Lewis, Buffalo Grove, IL (US)

(72) Inventor: Richard Lewis, Buffalo Grove, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 0 days.

(21) Appl. No.: 13/924,147

(22) Filed: Jun. 21, 2013

(65) Prior Publication Data

US 2014/0375823 A1 Dec. 25, 2014

(51) Int. Cl.
*H04N 17/00* (2006.01)
*H04N 17/02* (2006.01)
*H04N 17/04* (2006.01)
*H04N 21/214* (2011.01)
*H04N 21/442* (2011.01)
*H04N 21/47* (2011.01)

(52) U.S. Cl.
CPC ........... *H04N 17/004* (2013.01); *H04N 17/045* (2013.01); *H04N 21/2143* (2013.01); *H04N 21/44209* (2013.01); *H04N 21/47* (2013.01)

(58) Field of Classification Search
CPC .............. H04N 17/004; H04N 17/045; H04N 21/2143; H04N 21/44209; H04N 21/47
USPC .......................... 348/180–194; 725/107–108
See application file for complete search history.

(56) References Cited

U.S. PATENT DOCUMENTS

| 5,822,221 | A | 10/1998 | Groenteman |
| 2006/0033814 | A1* | 2/2006 | Avadanei et al. ............. 348/193 |
| 2010/0157144 | A1* | 6/2010 | Okamoto et al. ............. 348/441 |
| 2011/0075576 | A1* | 3/2011 | Patil et al. ...................... 370/252 |
| 2013/0057705 | A1* | 3/2013 | Parker et al. ................... 348/184 |

* cited by examiner

*Primary Examiner* — Michael Lee

(57) ABSTRACT

In a central television diagnostics system, a plurality of remotely located televisions are connected to a central television distribution facility. The remote televisions each have a microprocessor receiving signal quality values and a memory for storing the quality values. One of the quality values comprises a base line measurement value and another comprises a current measurement value. The microprocessor selectively displays on a display of said television a history of said measurement values upon command by a user or service technician desiring to diagnose the status of signal quality at said television.

25 Claims, 4 Drawing Sheets

Alert Level – 3 db
HAV Level – 1 db

| Logical # (if known) | Physical Channel | BLV | CMV | HAV | HAV |
|---|---|---|---|---|---|
| 1 | 27-1 | 8 db 03/15/2012 | 7.9 db 07/20/2012 | | |
| 2 | 3-1 | 8 db 03/15/2012 | 5.0 db 07/20/2012 | 6 db 06/30/2012 | 7 db 04/16/2012 |
| 3 | 22-2 | 8 db 03/15/2012 | 8 db 07/20/2012 | | |
| 4 | 22-1 | 8 db 03/15/2012 | 8 db 07/20/2012 | | |

*Figure 4*

DIAGNOSTICS SYSTEM FOR REMOTELY LOCATED TELEVISIONS

BACKGROUND

As illustrated in prior art FIG. 1, a television system 8 having a plurality of remotely located televisions 9A-9D, such as in hotel rooms, are fed by individual cables 8A-8D originating from a central television distribution facility 10 typically located in the same building with the hotel rooms. Alternatively, each hotel room can be supplied by a drop from one or more central cables. The central television facility 10 provides the RF television signals to the televisions. Frequently these remote televisions are also connected for data transmission to or from a central server 11 having an associated server display 12 via Internet protocol (IP) lines 13A-13D. The server may be linked to the central distribution facility 10. Alternatively, the data may be transmitted via the cables 8A-8D by use of an RF modem to deliver the data to or from the central TV distribution facility 10 and then to the central server 11. In the case where an IP connection is provided, television signals may also be provided via internet protocol to the remotely located televisions 9A-9D via internet connections 13A-13D.

In such television systems, a significant number of problems are caused by degradation of the RF television signals delivered by the respective cable into the room where the television is located or by other distribution equipment such as amplifiers, combiners, splitters and the like. The RF signal to the television is typically of a highest quality at a time of installation of the television. However degradation can occur precipitously or over time, such as by degradation of the individual signal transmission line to the particular room, degradation of the connection of the cable to the television, and/or internal degradation within the television itself such as in the television RF stages or the like. Degradation of the television signals provided to the room televisions can likewise occur when they are delivered by IP.

SUMMARY

It is an object to detect a degradation of signal level or quality at remotely located televisions in a remote television system, preferably before the degradation becomes severe, to allow maintenance procedures to be performed prior to a user of the television such as a hotel guest not having a functioning television caused by the degradation. It is also an object to provide a timely warning that performance of televisions at remote locations in the system is degrading.

In a central cable television diagnostics system, a plurality of remotely located televisions are connected to a central cable television distribution facility. This connection may be by RF cables or IP. In the case of an RF cable connection, the remote televisions each have a microprocessor receiving quality values and a memory for storing the quality values. One of the quality values comprises a base line measurement value and another comprises a current measurement value. The microprocessor selectively displays on a display of said television a history of said measurement values upon command by a user or service technician desiring to diagnose the status of quality at said television. The quality values may be RF signal strength or bit error rate, or in the case of IP delivered television signals, corresponding values such as signal to noise ratios and frame error rates may be stored as base line and current measurement values to facilitate the diagnosis. Also, in the case where there is a return path to a central maintenance facility, such as at the central server, alerts and measurement values can be provided to the facility for diagnosis.

BRIEF DESCRIPTION OF THE DRAWINGS

FIG. 4 is a diagnostics table viewable at the remote television or central server.

DESCRIPTION OF PREFERRED EXEMPLARY EMBODIMENTS

Figure 1:
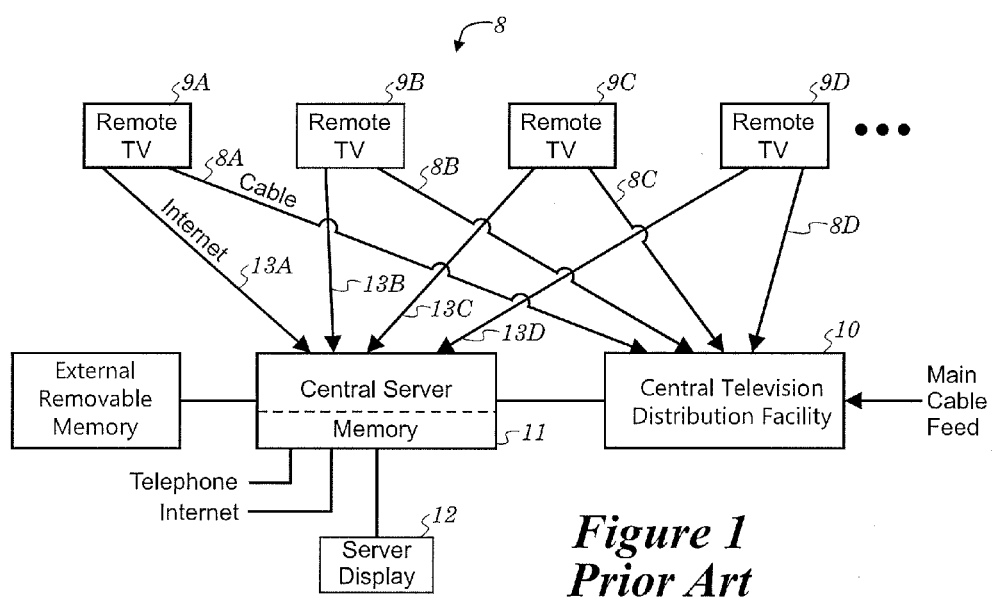
FIG. 1 is a block diagram illustrating a prior art television system having remotely located televisions connecting to a central television distribution facility transmitting television program streams on specific RF channel frequencies or as IP streams from specific addresses (the "channel map") and a central server.

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

The diagnostics system of the exemplary embodiment is provided for diagnostic monitoring in a television system used in hotels and such places where there are many televisions served by a common infrastructure to monitor. The television records the level of the RF signal or bit error rate (BER) for each channel (hereinafter references to RF signal levels include BER) of the television when the television is programmed with the desired channel map or a previously programmed channel map is updated and stores it as a base line value (BLV) on the network preferably at the remote TV, but possibly also or alternatively at the central server. The signal level may degrade precipitously at some time or degrade gradually over the life of the television. When the RF signal level degrades enough by comparison to a threshold value (for example 1 db, 2 db, or 3 db), an "Alert" can be issued at the TV or central server so that the television can be removed from service or repaired before it fails. It will be understood that the televisions can be diagnosed in a like fashion when the television signals are provided by IP by using quality parameters such as signal to noise ratio and frame error rates instead of RF signal levels and BER.

Figure 2:
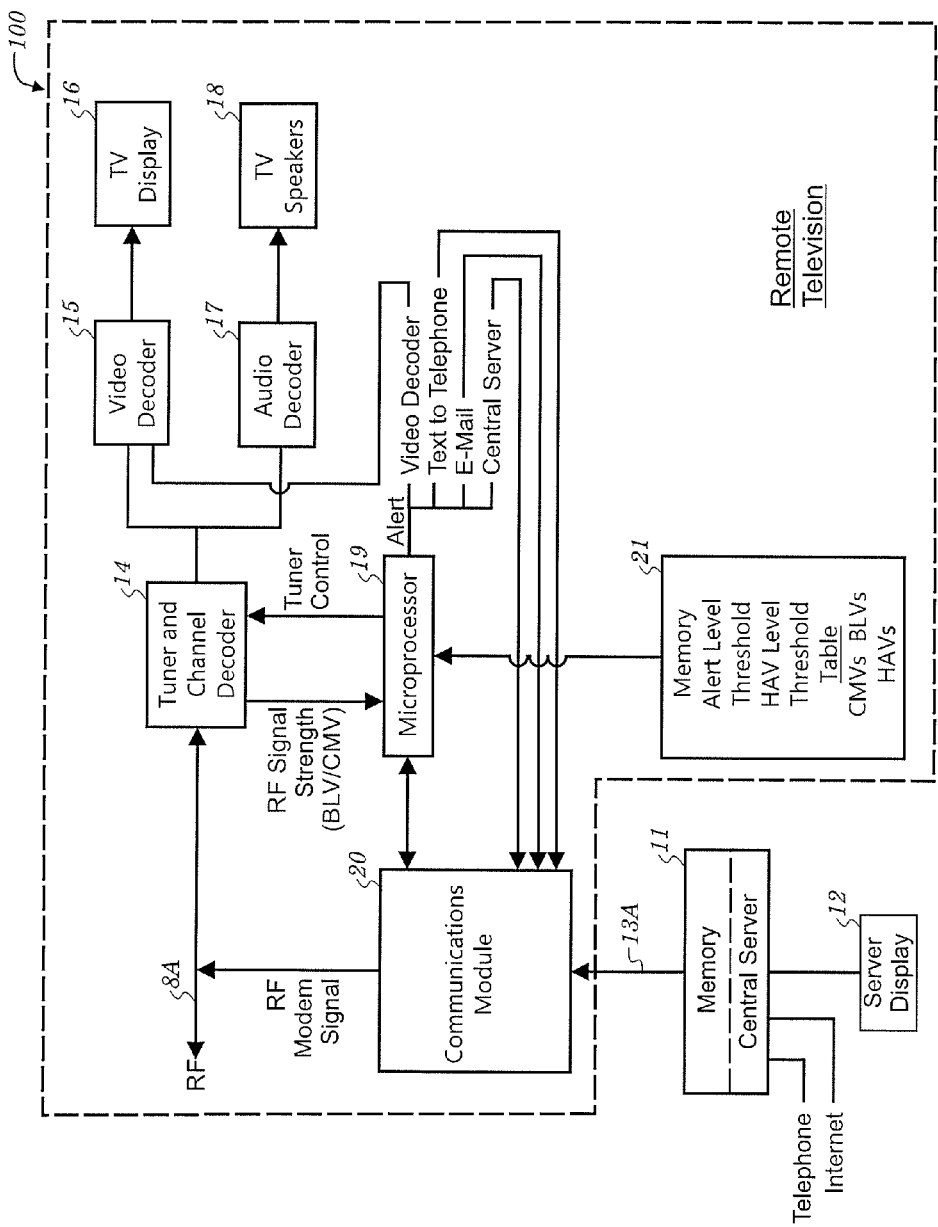
FIG. 2 is a block diagram showing modules in a remote television programmed to conduct a diagnostics analysis according to a preferred exemplary embodiment.

A block diagram of elements within each of a plurality of remote televisions 100 utilized in the preferred exemplary embodiment is illustrated in FIG. 2. Here the cable 8A provides the incoming RF television signals from the central television distribution facility 10 (see FIG. 1) to a tuner and channel decoder 14. The tuner and channel decoder 14 outputs to a video decoder 15 and television display 16 (the remote television screen). Additionally, the tuner and channel decoder 14 outputs signals to an audio decoder 17 connected to speakers 18 of the television. Alternatively, the television signals are delivered by IP from the central server 11 to the communications module 20 on line 13A.

A microprocessor 19 provides tuner control to the tuner and channel decoder 14 and also reads RF signal strength or BER values from the tuner and channel decoder 14 and stores them in a memory 21 as base line values (BLV) or current measured values (CMV). Memory 21 also stores an Alert threshold, a historical archive value (HAV) threshold, and contains an array, such as a table, of HAVs, CMVs and BLVs. The microprocessor 19 outputs an alert signal to the video decoder 15, and to the central server 11 through communications module 20, and/or a text/SMS message to a telephone, and/or e-mail, and/or for general use such as display at the central server 11 when a CMV exceeds the Alert threshold and causes a HAV to be stored in memory 21, when the CMV exceeds the HAV threshold. For example the Alert threshold may be about 3 db and the HAV threshold may be about 1 db. The microprocessor 19 also may output to the communications module 20 the RF signal strength information such as in the form of an array, such as a table, or raw data to be used for diagnostics at the central server 11. This information may be signal strength and/or error rate, tuner lock status and the like. The communications module 20 may comprise an IP module and/or an RF modem for providing the return signals to the central server 11 either via the IP line 13A or via the cable 8A.

Figure 3:
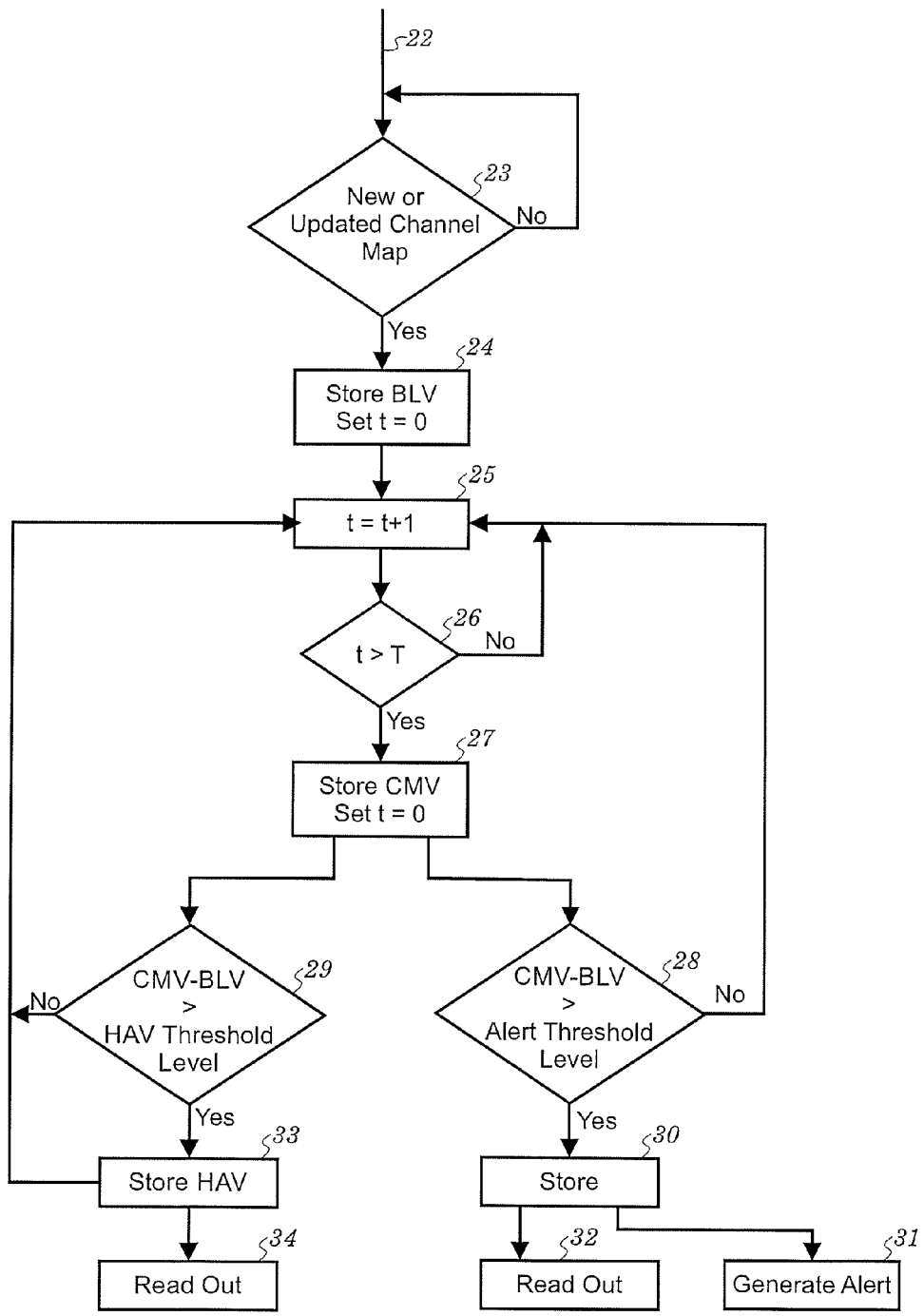
FIG. 3 is a flow chart of software used for the diagnostics analysis according to the exemplary embodiment.

A flow chart for software stored in the television 100 and possibly also in the central server for the remote diagnostics system of the exemplary embodiment is illustrated in FIG. 3. At start point 22, it is assumed that the remote television 100 either newly installed or existing in the hotel room receives a new or updated channel map at decision block 23. The television microprocessor memory 21 (and possibly also the central server 11) stores the base line measurement value (BLV) of RF signal strength (and/or BER or, in the case of an IP provided television signal, the signal to noise ration or frame error rate as a measure of signal quality) as a measurement parameter. Also time is set to t=0. At block 25 the time t is incremented and at decision block 26 it is checked whether the time t is greater than a reference time T. If t>T the current measured value (CMV) is stored at block 27 and the time is again set to t=0. At decision block 28 it is determined whether the current measurement value (CMV) minus the baseline measurement value (BLV) is greater than the Alert threshold. If so, it is stored as shown at block 30 in the television memory 21 and/or in the memory internal and/or external of the central server 11. An alert is generated at 31 and readout occurs at block 32, either occurring at the TV or the central server.

At decision block 29 the current measurement value (CMV) is compared to the base line measurement value (BLV) and the result is checked to see whether it is greater than the historical archive value (HAV) threshold. If so, the historical archive value (HAV) is stored as shown at block 33 and read out at block 34.

Alternatively to incrementing a timer for developing CMVs as shown in FIG. 3, many other techniques could be used for providing a sequence of CMVs. For example, each time a new channel is tuned on the television or a given channel is tuned a predetermined number of times a CMV can be provided.

As illustrated in FIG. 2, a table of BLVs, CMVs and HAVs is stored in memory 21 within the remote television 100. An exemplary embodiment of that table is shown in FIG. 4. This table or portions of this table may be displayed on the TV display screen 16, such as upon command by a service technician, for servicing that particular remote television in the hotel room. The service technician would cause display of the table or portions of the table to allow the technician to determine whether the RF signal level (or other signal quality parameter) has been degraded and in what manner. The service technician may then either replace the television and/or repair the cable and/or connector to the television to prevent an ultimate failure of the television due to the low RF level causing low signal strength and/or an unacceptable error rate.

Alternatively, the table may be displayed at the server display 12 of the central server 11, or at both the server display 12 and the TV display screen 16. By displaying the diagnostic table results at the server display 12, it would be possible for a service technician at the central server 11 to monitor the condition of a plurality of the remote televisions from one location to determine whether degradation has occurred at one or more of the remote televisions in the system. Additionally, by checking all televisions in the system, it would be possible for the service technician to determine whether there is a common transmission feed problem to all of the televisions causing degraded RF levels at all of the televisions. He may therefore determine whether the problem lies at a common transmission point, such as the central cable TV distribution system, or at individual locations affecting only certain ones of the remote televisions.

Thus, according to a preferred exemplary embodiment, the remote television 100 provides a warning that performance is degrading in time to prevent outages. A significant number of problems are caused by the degradation of the RF signal into the hotel room. Since the signal is usually of the highest quality at the time of installation, this can serve as a base line of the RF signal level achieved at installation time, which is used as a base line to measure degradation over time.

When a "channel map" is introduced or updated for the respective remotely located television, the television generates the base line measurement value (BLV) of signal strength and/or error rate (or other signal quality parameter) as a measurement parameter or parameters. This base line measurement value (BLV) is then stored in the television at memory 21 and/or at the central server 11 memory shown in FIG. 2.

In a warning mode, each remote television 100 generates and stores a current measured value (CMV) of the measurement parameter or parameters on a periodic basis and builds a history of stored HAVs that is displayed and reviewed against the base line measurement value (BLV).

Trigger or alarm levels are configured to display alerts generated when the current measured value (CMV) falls below the Alert threshold level. Also a threshold value is configured to store historical values. For example, a 3 db degradation between a BLV and a CMV may generate an Alert but a 1 db degradation may generate a historical archive value (HAV) for storage. In this example, when the Alert is generated there are already historical archive values (HAVs) showing gradual degradation over time for the respective remotely located television 100.

If an internet protocol (IP) back channel IP communications line 13A or RF back channel communications via an RF modem through cable 8A is provided, the values may be also sent to the central server (CS) illustrated at 11 in FIG. 2 for correlation to room location when the maintenance technician is conducting diagnostics analysis and operator notification. If the central server 11 receives alarms from a large number of rooms, the technician may thus determine whether a specific channel or a general outage has occurred.

Information display for non-return channel remote television is as follows (no signal being sent from the remote TV to the central server 11). The diagnostics information as shown in the table of FIG. 4 is accessible to a technician at the room where the remote television 100 is located as an extension of a current read only installer menu and is contained as a new "tab" or page.

For a return channel remote television 100 where the television can transmit data over a back channel (via internet line 13A back to the central server 11 or via a modem over the cable 8A), in addition to hosting the table as shown in FIG. 4, alerts are sent to the central server 11 for processing. Additionally the server 11 or users can request that a full table or partial entries be sent when requested.

For security and authentication, as part of an automated installation routine, the remote television 100 will attempt to register itself with the central server (CS) 11 providing its MAC address and an optional room identifier that is input at the time of installation.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. A central television diagnostic system, comprising:
a plurality of remotely located televisions receiving television signals of a plurality of television channels and being connected to a central television distribution facility sending the television signals to the remotely located televisions;
each of said remote televisions having a microprocessor receiving signal quality values for said received television signals of said plurality of television channels and a memory for storing said signal quality values; and
one of said signal quality values comprising a unique base line measurement value for each channel acquired at a respective predetermined time for each channel and another of said signal quality values comprising a respective current measurement value for each channel, said microprocessor comparing a difference between each said unique respective base line measurement value and each said respective current measurement value to a historical archive value threshold to decide for each of said plurality of channels whether to store said respective current measurement value as a respective historical archive value.

2. The system of claim 1 wherein said microprocessor also compares said difference to an alert threshold to decide whether to generate an alert signal.

3. The system of claim 1 wherein said signal quality values are at least one of RF signal strength, bit error rate, signal to noise ratio, and frame error rate.

4. The system of claim 1 wherein a central server is provided, and the microprocessor of each remote television transmits the signal quality values to said central server.

5. The system of claim 1 wherein said microprocessor obtains said current measurement values at periodic time intervals.

6. The system of claim 1 wherein the microprocessor obtains said current measurement values at times determined by a channel tuning of the television.

7. The system of claim 1 wherein said base line measurement value is determined at a time of installation of the remote television.

8. The system of claim 1 wherein said base line measurement value is determined at time of a channel map installation or a channel map update.

9. The system of claim 1 wherein upon command by a user or a technician, said microprocessor causes said television to display a table of channels and for each channel the base line measurement value, the current measurement value, and the historical archive value if the historical archive value was generated.

10. The system of claim 1 wherein the microprocessor transmits signal quality values as diagnostic information to a central server connected to a plurality of said remote televisions for displaying said diagnostic information for each of said televisions at a central location in addition to display of said diagnostic information on the display of the remote television.

11. The system of claim 2 wherein said alert signal is at least one of a message text to a telephone, an e-mail, an alert sent to the remote television display, and an alert for display at a central server connected to said remote televisions.

12. The system of claim 1 wherein a plurality of historic archive measurement values are stored.

13. The system of claim 1 wherein the current measurement value is measured at a time when a user or a technician enters a command.

14. A central television diagnostic system, comprising:
a plurality of remotely located televisions receiving television signals of a plurality of television channels and being connected to a central television distribution facility sending the television signals to the remotely located televisions;
each of said remote televisions having a microprocessor receiving signal quality values for said received television signals of said plurality of television channels and a memory for storing said signal quality values; and
one of said signal quality values comprising a unique base line measurement value for each channel acquired at a respective predetermined time for each channel, and another of said signal quality values comprising a respective current measurement value for each channel, said microprocessor comparing a difference between each said unique respective baseline measurement value and each said respective current measurement value to a historical archive value threshold to decide for each of said plurality of channels whether to store said respective current measurement value as a respective historical archive value, and said microprocessor causing said measurement values to be displayed upon command by a user or technician desiring to diagnose a status of signal quality at said television.

15. A method for diagnosing weak signal strength in remote televisions of a central television distribution facility, said remote televisions receiving television signals of a plurality of television channels sent to the remote television by the central television distribution facility, comprising the steps of:
providing each of said remote televisions with a microprocessor receiving signal quality values for said received television signals of said plurality of television channels and a memory for storing said signal quality values, one of said signal quality values comprising a unique base line measurement value for each channel acquired at a respective predetermined time for each channel and another of said signal quality values comprising a respective current measurement value for each channel; and
with said microprocessor, comparing a difference between each said unique respective base line measurement value and each said respective current measurement value to a historical archive value threshold to decide for each of said plurality of channels whether to store said respective current measurement value as a respective historical archive value.

16. A remote television for use in a television diagnostic system, comprising:
- a tuner receiving television signals of a plurality of television channels sent to the remote television from a central television distribution facility and a detection system connected to the tuner which creates signal quality values of signals output from said tuner corresponding to said received television signals of said plurality of television channels;
- a microprocessor receiving said signal quality values and a memory for storing said signal quality values, one of said signal quality values comprising a unique base line measurement value for each channel acquired at a respective predetermined time for each channel and another of said signal quality values comprising a respective current measurement value for each channel; and
- said microprocessor comparing a difference between each said unique respective base line measurement value and each said current measurement value to a historical archive value threshold to decide for each of said plurality of channels whether to store said respective current measurement value as a respective historical archive value.

17. The remote television of claim 16 wherein said microprocessor also compares said difference to an alert threshold to decide whether to generate an alert signal.

18. The remote television of claim 16 wherein said signal quality values are at least one of RF signal strength, bit error rate, signal to noise ratio, and frame error rate.

19. The remote television of claim 16 wherein said microprocessor obtains said current measurement values at periodic time intervals.

20. The remote television of claim 16 wherein the microprocessor obtains said current measurement values at times determined by a channel tuning of the television.

21. The remote television of claim 16 wherein said base line measurement value is determined at a time of installation of said remote television.

22. The remote television of claim 16 wherein said base line measurement value is determined at time of a channel map installation or a channel map update.

23. The remote television of claim 16 wherein upon command by a user or a technician, said microprocessor causes said television to display a table of channels and for each channel the base line measurement value, the current measurement value, and the historical archive value if the historical archive value was generated.

24. The remote television of claim 16 wherein a plurality of historic archive measurement values are stored.

25. The remote television of claim 16 wherein the current measurement value is measured at a time when a user or a technician enters a command.

* * * * *